(12) United States Patent
Kondrk et al.

(10) Patent No.: US 11,827,080 B2
(45) Date of Patent: Nov. 28, 2023

(54) HEATED GAS DETECTOR

(71) Applicant: Carrier Corporation, Palm Beach Gardens, FL (US)

(72) Inventors: Jason R. Kondrk, Clay, NY (US); Stella M. Oggianu, Farmington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/973,341

(22) PCT Filed: Sep. 10, 2020

(86) PCT No.: PCT/US2020/050105
§ 371 (c)(1),
(2) Date: Dec. 8, 2020

(87) PCT Pub. No.: WO2021/055221
PCT Pub. Date: Mar. 25, 2021

(65) Prior Publication Data
US 2022/0297510 A1 Sep. 22, 2022

Related U.S. Application Data

(60) Provisional application No. 62/902,112, filed on Sep. 18, 2019.

(51) Int. Cl.
*B60H 1/32* (2006.01)
*B60P 3/20* (2006.01)
(Continued)

(52) U.S. Cl.
CPC .............. *B60H 1/3232* (2013.01); *B60P 3/20* (2013.01); *F25D 11/003* (2013.01);
(Continued)

(58) Field of Classification Search
CPC .. F25D 11/003; F25D 29/003; F25D 2500/14; F25D 2500/222; F25D 2700/02; F25D 2400/02; B60H 1/3232
See application file for complete search history.

(56) References Cited

U.S. PATENT DOCUMENTS 5,468,961 A    11/1995  Gradon et al.
5,886,348 A     3/1999  Lessure et al.
(Continued)

FOREIGN PATENT DOCUMENTS

CN    108195788 A     6/2018
CN    208206922 U    12/2018
(Continued)

OTHER PUBLICATIONS

WO-2015032905-A1 translation.*

(Continued)

*Primary Examiner* — Elizabeth J Martin
(74) *Attorney, Agent, or Firm* — CANTOR COLBURN LLP

(57) ABSTRACT

Disclosed is a gas detector system for a refrigerated interior volume of a transportation refrigeration unit (TRU), the system having: a gas detector that defines an enclosure, the enclosure defines a chamber therein, the cover including a chamber opening, and an infrared (IR) sensor within the chamber; and a heater adjacent to or within the enclosure, the heater configured to reduce moisture within the chamber and/or prevent moisture from accumulating from within the chamber during a refrigeration cycle.

15 Claims, 5 Drawing Sheets

(51) Int. Cl.
*F25D 11/00* (2006.01)
*F25D 29/00* (2006.01)

(52) U.S. Cl.
CPC ........ *F25D 29/003* (2013.01); *F25B 2500/14* (2013.01); *F25B 2500/222* (2013.01); *F25B 2700/02* (2013.01)

(56) References Cited

U.S. PATENT DOCUMENTS

| | | | |
|---|---|---|---|
| 6,503,751 | B2 | 1/2003 | Hugh |
| 7,237,946 | B2 | 7/2007 | Lindstrom et al. |
| 7,288,766 | B2 | 10/2007 | Uchida et al. |
| 7,301,148 | B2 | 11/2007 | Johnson |
| 7,332,716 | B2 | 2/2008 | Hamrelius et al. |
| 9,121,634 | B2 | 9/2015 | Rogers et al. |
| 9,188,534 | B2 | 11/2015 | Stock et al. |
| 9,322,774 | B2 | 4/2016 | Moenkemoeller |
| 9,551,651 | B2 | 1/2017 | Hegeman et al. |
| 9,709,498 | B2 | 7/2017 | Moenkemoeller |
| 10,168,092 | B2 | 1/2019 | Tanaka et al. |
| 2016/0203694 | A1 | 7/2016 | Hogsten et al. |
| 2018/0327179 | A1 | 11/2018 | Papas et al. |

FOREIGN PATENT DOCUMENTS

| | | | | |
|---|---|---|---|---|
| CN | 110006838 | A | 7/2019 | |
| GB | 2562275 | A | 11/2016 | |
| JP | 2006038721 | A | 2/2006 | |
| JP | 2017053514 | A * | 3/2017 | |
| KR | 1020170088218 | A | 8/2017 | |
| WO | 2015032905 | A1 | 3/2015 | |
| WO | WO-2015032905 | A1 * | 3/2015 | ........... F25D 29/008 |
| WO | 2017083336 | A1 | 5/2017 | |

OTHER PUBLICATIONS

JP-2017053514-A translation.*
International Search Report for International Application No. PCT/US2020/050105; Date of Completion: Nov. 17, 2020; dated Nov. 26, 2020; 5 Pages.
Written Opinion of the International Searching Authority for International Application No. PCT/US2020/050105; International Filing Date: Sep. 10, 2020; dated Nov. 26, 2020; 9 Pages.
European Office Action; dated Apr. 29, 2022; Application No. 20780468.3; Filed: Sep. 10, 2020; 6 pages.

* cited by examiner

HEATED GAS DETECTOR

CROSS REFERENCE TO RELATED APPLICATIONS

This application is a Non-Provisional Application of PCT/US2020/050105 filed Sep. 10, 2020, which claims the benefit of U.S. Application No. 62/902,112 filed Sep. 18, 2019, the disclosure of which is incorporated herein by reference in its entirety.

BACKGROUND

The following description relates to gas detector and, more specifically, to a heated non-dispersive infrared (NDIR) gas detector for flammable low global warming potential (GWP) refrigerants.

A typical refrigerated cargo container, such as those utilized to transport cargo via sea, rail or road, is a container modified to include a refrigeration unit located at one end of the container. The refrigeration unit includes a compressor, condenser, expansion valve and evaporator. A volume of refrigerant circulates throughout the refrigeration unit, and one or more evaporator fans of the refrigeration unit blow a flow of supply air across the evaporator thereby cooling the supply air and forcing it out into the container.

In those cases in which the refrigeration unit uses a refrigeration cycle to cool the supply air, a portion of the volume of the refrigerant can may leak inside the conditioned space. As the refrigerant can be a mildly or highly flammable low GWP refrigerant, for example, a leak of the refrigerant inside the conditioned space can pose a danger to the refrigerated cargo and to personnel handling the refrigerated cargo container.

Therefore, gas detectors are often provided in refrigerated cargo containers or the refrigeration unit in order to sense gas being present due to a leak. Such gas detectors can include non-dispersive infrared (NDIR) technology and are used to determine concentrations of particular gases in a given atmosphere.

BRIEF DESCRIPTION

Disclosed is a gas detector system for a refrigerated interior volume of a transportation refrigeration unit (TRU), the system comprising: a gas detector that defines an enclosure, the enclosure defines a chamber therein, the cover including a chamber opening, and an infrared (IR) sensor within the chamber; and a heater adjacent to or within the enclosure, the heater configured to maintain the temperature required to reduce the relative moisture content within the chamber and/or prevent moisture from condensing from within the chamber.

In addition to one or more of the above disclosed aspects or as an alternate the heater comprises a plurality of heating elements mutually spaced alongside one or more of the plurality of sidewalls of the enclosure or within the chamber.

In addition to one or more of the above disclosed features or as an alternate the system includes an enclosure temperature sensor disposed inside or proximate to the enclosure, wherein during the refrigeration cycle: when a temperature inside or proximate to the enclosure is less than ambient temperature, the heater is activated; and when the temperature inside or proximate to the enclosure is greater than ambient temperature, the heater is deactivated.

In addition to one or more of the above disclosed features or as an alternate the system includes a humidity sensor operationally connected to the heater, disposed inside or proximate to the enclosure, wherein during the refrigeration cycle: when a humidity level inside or proximate to the enclosure is greater than a humidity threshold, the heater is activated; and when the humidity level inside or proximate to the enclosure is less than the humidity threshold, the heater is deactivated.

In addition to one or more of the above disclosed features or as an alternate the system includes an enclosure temperature sensor operationally connected to the heater, the enclosure temperature sensor disposed inside or proximate to the enclosure, wherein: the heater is activated upon initiating the refrigeration cycle, and when a temperature threshold is reached at the enclosure, the heater is deactivated.

In addition to one or more of the above disclosed features or as an alternate the system includes periodically activating and deactivating the heater during the refrigeration cycle.

Further disclosed is a transport refrigeration unit (TRU) comprising a compressor, a condenser, an evaporator, a controller operationally connected to the compressor, the condenser and the evaporator, and the refrigerated interior volume, the refrigerated interior volume including a system having one or more of the above disclosed aspects, wherein the heater is operationally connected to the controller.

In addition to one or more of the above disclosed features or as an alternative the controller is configured to delay or suspend the refrigeration cycle while the heater is heating the enclosure and until the temperature inside or proximate to the enclosure is greater than or equal to temperature given threshold, selected to maintain low relative humidity levels within the chamber. It is to be appreciated that when a humidity sensor it utilized instead or in addition to a temperature sensor, a threshold can be implemented to maintain a relative humidity level that is lower or equal to a given threshold. That is, the thresholds may vary and correlate with one another.

In addition to one or more of the above disclosed features or as an alternate the method includes the TRU includes a compressor, a condenser, an evaporator, a controller operationally connected to the compressor, the condenser and the evaporator, and the refrigerated interior volume, the refrigerated interior volume including a system having one or more of the above disclosed aspects, wherein the heater is operationally connected to the controller.

In addition to one or more of the above disclosed aspects or as an alternate the controller is configured to delay or suspend the refrigeration cycle while the heater is heating the enclosure and until the humidity level inside or proximate to the enclosure is less than the humidity threshold.

Further disclosed is a TRU comprising a compressor, a condenser, an evaporator, a controller operationally connected to the compressor, the condenser and the evaporator, and the refrigerated interior volume, the refrigerated interior volume including a system having one or more of the above disclosed aspects, wherein the heater is operationally connected to the controller.

In addition to one or more of the above disclosed features or as an alternate when initiating the refrigeration cycle the controller is configured to delay or suspend the refrigeration cycle while the heater is heating the enclosure and until the temperature inside or proximate to the enclosure has reached the temperature threshold or the relative humidity is below the humidity threshold.

Further disclosed is a method of operating a gas detector system for a refrigerated interior volume of a transportation refrigeration unit (TRU), the method comprising: heating an enclosure of a gas detector during a refrigeration cycle to reduce moisture within the enclosure and/or prevent moisture from accumulating from within the enclosure, wherein the enclosure defines a chamber therein, the cover including a chamber opening, and an infrared (IR) sensor is disposed within the chamber, and wherein a heater configured for heating the enclosure is adjacent to or within the enclosure.

In addition to one or more of the above disclosed features or as an alternate the method includes heating the enclosure only when a temperature inside or proximate to the enclosure is less than ambient temperature during the refrigeration cycle, wherein an enclosure temperature sensor is operationally connected to the heater and the enclosure temperature sensor is disposed inside or proximate to the enclosure.

In addition to one or more of the above disclosed features or as an alternate the method includes delaying or suspending the refrigeration cycle while heating the enclosure and until the temperature inside or proximate to the enclosure is greater than or equal to ambient temperature.

In addition to one or more of the above disclosed features or as an alternate the method includes heating the enclosure only when a humidity level inside or proximate to the enclosure is greater a humidity threshold during the refrigeration cycle, wherein a humidity sensor is operationally connected to the heater, and the humidity sensor is disposed inside or proximate to the enclosure.

In addition to one or more of the above disclosed features or as an alternate the method includes delaying or suspending the refrigeration cycle while heating the enclosure and until the humidity level inside or proximate to the enclosure is less than the humidity threshold.

In addition to one or more of the above disclosed features or as an alternate the method includes heating the enclosure upon initiating the refrigeration cycle and until a temperature threshold is reached, wherein an enclosure temperature sensor is operationally connected to the heater, the enclosure temperature sensor being disposed inside or proximate to the enclosure.

In addition to one or more of the above disclosed features or as an alternate the method includes periodically pulsating heat during the refrigeration cycle after the temperature threshold is reached.

In addition to one or more of the above disclosed features or as an alternate the method includes delaying or suspending the initiating of the refrigeration cycle while heating the enclosure and until the temperature inside or proximate to the enclosure has reached the temperature threshold.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Figure 1:
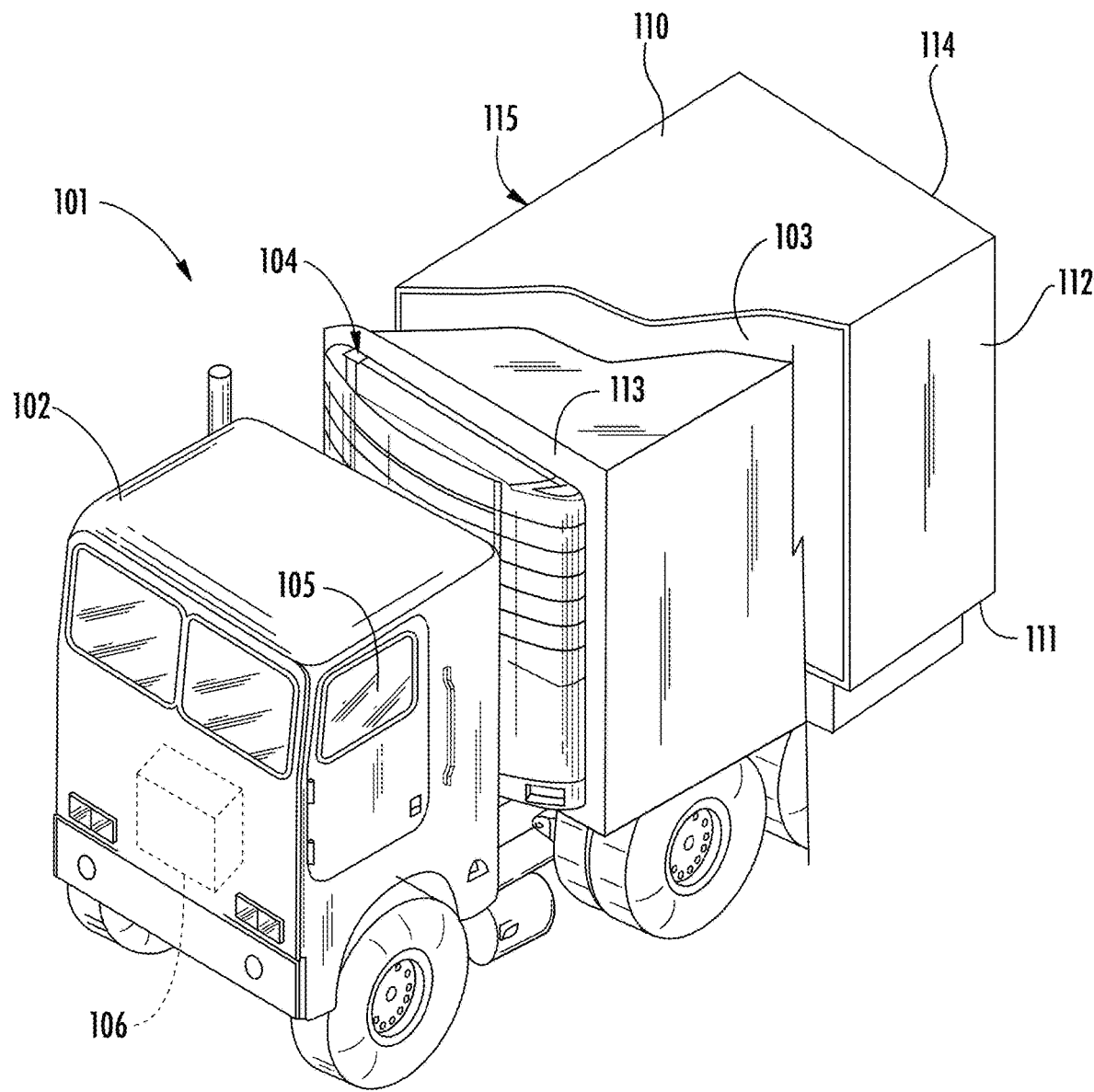
FIG. 1 is a perspective view of a transport vehicle which may utilize one or more aspects of the disclosed embodiments.

With reference to FIG. 1, a transport system 101 is illustrated and includes a tractor or vehicle 102, a conditioned space 103 that is pulled by the vehicle 102 and a refrigeration system 104 that conditions the air within the conditioned space 103.

While the transport system 101 is described herein as being a conditioned space 103 pulled by vehicle 102, it is to be understood that embodiments exist in which the conditioned space 103 is shipped by rail, sea or air or may be provided within any suitable container where the vehicle 102 is a truck, train, boat, airplane, helicopter, etc.

The vehicle 102 may include an operator's compartment or cab 105 and a vehicle motor 106. The vehicle 102 may be driven by a driver located within the cab, driven by a driver remotely, driven autonomously, driven semi-autonomously or any combination thereof. The vehicle motor 106 may be an electric or combustion engine powered by a combustible fuel. The vehicle motor 106 may also be part of the power train or drive system of a trailer system, thus the vehicle motor 106 is configured to propel the wheels of the vehicle 102 and/or the wheels of the conditioned space 103. The vehicle motor 106 may be mechanically connected to the wheels of the vehicle 102 and/or the wheels of the conditioned space 103.

The conditioned space 103 may be coupled to the vehicle 102 and is thus pulled or propelled to desired destinations. The conditioned space 103 may include a top wall 110, a bottom wall 111 opposed to and spaced from the top wall 110, two side walls 112 spaced from and opposed to one-another and opposing front and rear walls 113 and 114 with the front wall 113 being closest to the vehicle 102. The conditioned space 103 may further include doors (not shown) at the rear wall 114 or any other wall. The top, bottom, side and front and back walls 110, 111, 112 and 113 and 114 together define the boundaries of a refrigerated interior volume 115. The refrigeration system 104 is configured to condition the refrigerated interior volume 115.

Figure 2:
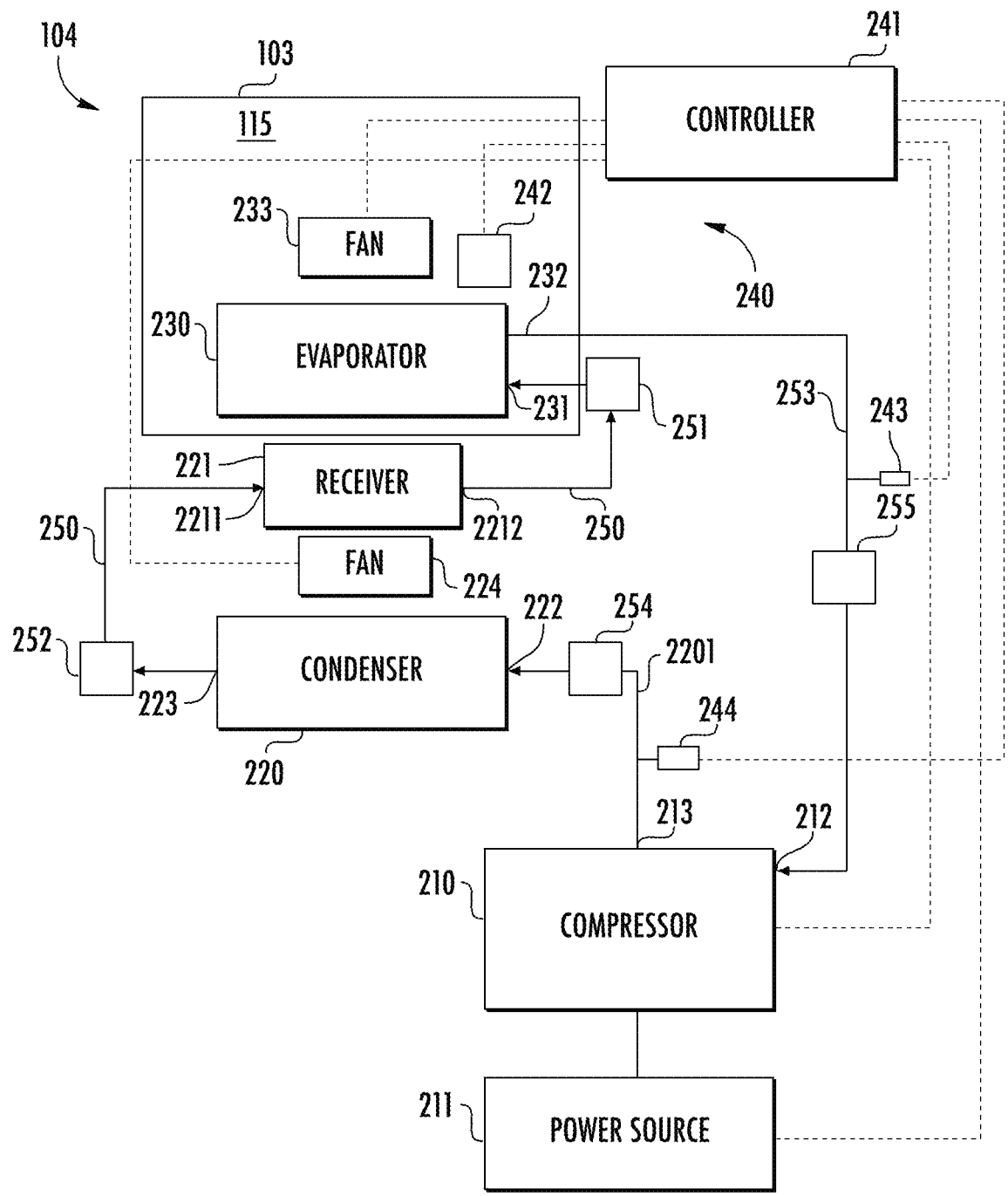
FIG. 2 is a schematic diagram of a refrigeration system of the transport vehicle of FIG. 1.

With reference to FIG. 2, the conditioned space 103 may be provided as an interior of a refrigerated trailer, a refrigerated truck, a refrigerated space or a refrigerated container with the refrigeration system 104 adapted to operate using a refrigerant such as a low GWP refrigerant such as A1, A2, A2L, A3, etc. In some cases, the refrigerant may leak into the refrigerated interior volume 115 and may present a hazard should the concentration of the leaked refrigerant within refrigerated interior volume 115 exceed a threshold level. The threshold level needs to be a lower flammability limit of the refrigerant.

An evaporator 230, a portion of a refrigerant line 253 proximate an evaporator outlet 232 and a portion of a refrigerant line 250 proximate an evaporator inlet 231 may be located within the refrigerated interior volume 115 of the conditioned space 103 and thus may be a potential source of a refrigerant leak.

The refrigeration system 104 may be a transport refrigeration system such as a transportation refrigeration unit (TRU). The refrigeration system 104 includes a compressor 210, a condenser 220, an evaporator 230 and a leak detection system 240 that includes a leak sensor 242, which is communicative with a controller 241. The leak detection system 240 is arranged to detect and mitigate the presence of refrigerant within the refrigerated interior volume 115.

The compressor 210 is powered by or driven by a power source 211. The compressor 210 receives refrigerant through a compressor inlet 212 from the evaporator 230 and discharges refrigerant through a compressor outlet 213 to the condenser 220 through a receiver 221. The condenser 220 receives a fluid flow of refrigerant from the compressor 210 through a condenser inlet 222 and discharges a fluid flow of refrigerant through a condenser outlet 223 to the receiver 221. The condenser inlet 222 is fluidly connected to the compressor outlet 213 through a refrigerant line 2201. A fan, such as a condenser fan 224, may be associated with and disposed proximate to the condenser 220.

The evaporator 230 is arranged to receive a fluid flow of refrigerant from the condenser 220 through an evaporator inlet 231 and is arranged to discharge a fluid flow of refrigerant to the compressor 210 through an evaporator outlet 232. The evaporator inlet 231 is fluidly connected to the condenser outlet 223 through the receiver 221 via a refrigerant line 250 through a first valve 251 and/or a second valve 252 that is disposed on an opposite side of the receiver 221 than the first valve 251. The evaporator outlet 232 is fluidly connected to the compressor inlet 212 through a refrigerant line 253. A fan such as an evaporator fan 233 may be associated with and disposed proximate to the evaporator 230.

The first valve 251 may be an expansion valve such as an electronic expansion valve, a movable valve or a thermal expansion valve. The first valve 251 is movable between an open position and a closed position to selectively inhibit and facilitate a fluid flow of refrigerant between the evaporator 230 and at least one of the condenser 220 and the receiver 221. The open position facilitates a fluid flow of refrigerant between the evaporator inlet 231 and the condenser outlet 223 through the receiver 221. The closed position inhibits a fluid flow of refrigerant between the evaporator inlet 231 and the condenser outlet 223 through the receiver 221 as well as inhibits a fluid flow of refrigerant between the receiver 221 and the evaporator inlet 231.

The receiver 221 is fluidly connected to the condenser 220 and the evaporator 230 and is arranged to receive and store refrigerant based on a position of at least one of the first valve 251 and/or the second valve 252. The receiver 221 is arranged to receive refrigerant from the condenser outlet 223 through a first receiver inlet 2211 via the refrigerant line 250. In at least one embodiment, the second valve 252 is arranged to selectively facilitate a fluid flow between the condenser outlet 223 and the first receiver inlet 2211. The second valve 252 may be a movable valve, a solenoid valve, a liquid service valve, a thermal expansion valve or an electronic expansion valve and is movable between open and closed positions to facilitate or impede a fluid flow of refrigerant between the condenser outlet 223 and the first receiver inlet 2211. The receiver 221 is arranged to discharge or provide a fluid flow of refrigerant through a receiver outlet 2212 to the evaporator inlet 231 via the first valve 251 through the refrigerant line 250.

A third valve 254 may be arranged to selectively facilitate a fluid flow between the compressor outlet 213 and the condenser inlet 222. The third valve 254 may be a movable valve, check valve, a liquid service valve, a thermal expansion valve, or an electronic expansion valve and is movable between open and closed positions to facilitate or impede a fluid flow of refrigerant between the compressor outlet 213 and the condenser inlet 222.

A fourth valve 255 may be arranged to selectively facilitate a fluid flow between the evaporator outlet 232 and the compressor inlet 212. The fourth valve 255 may be a movable valve, check valve, a liquid service valve, a thermal expansion valve, or an electronic expansion valve and is movable between open and closed positions to facilitate or impede a fluid flow of refrigerant between the evaporator outlet 232 and the compressor inlet 212.

The leak detection system 240 includes the leak sensor 242, which is communicative with the controller 241. The leak sensor 242 may be disposed and configured to detect a selected concentration of refrigerant and thus to detect a refrigerant leak within the refrigerated interior volume 115 of the conditioned space 103.

The controller 241 is provided with input communication channels that are arranged to receive information, data, or signals from, for example, the compressor 210, the power source 211, the condenser fan 224, the first valve 251, the evaporator fan 233, the second valve 252, a pressure sensor 243, a compressor discharge pressure sensor 244 and the leak sensor 242. The controller 241 is provided with output communication channels that are arranged to provide commands, signals, or data to, for example, the compressor 210, the power source 211, the condenser fan 224, the first valve 251, the evaporator fan 233 and the second valve 252.

The controller 241 can be provided with at least one processor that is programmed to execute various operations including, but not limited to, a leak detection and/or leak mitigation strategy based on information, data, or signals provided via the input communication channels and output commands via the output communication channels.

The leak sensor 242 is arranged to provide a signal indicative of a concentration, amount or the presence of refrigerant within the refrigerated interior volume 115 of the conditioned space 103 to the controller 241. The leak sensor 242 may be disposed proximate to the evaporator 230 and/or may be disposed proximate the refrigerant line 250 or any other refrigerant line or component that could leak refrigerant into the conditioned space 103. The leak sensor 242 may also be located near a likely location where refrigerant may collect, such as near the bottom wall 111.

While the refrigeration system 104 has been described in accordance with embodiments herein, it is to be understood that other embodiments of the refrigeration system 104 and that other conditioning systems exist and that the following description is relevant to each of these various embodiments and systems.

Figure 3:
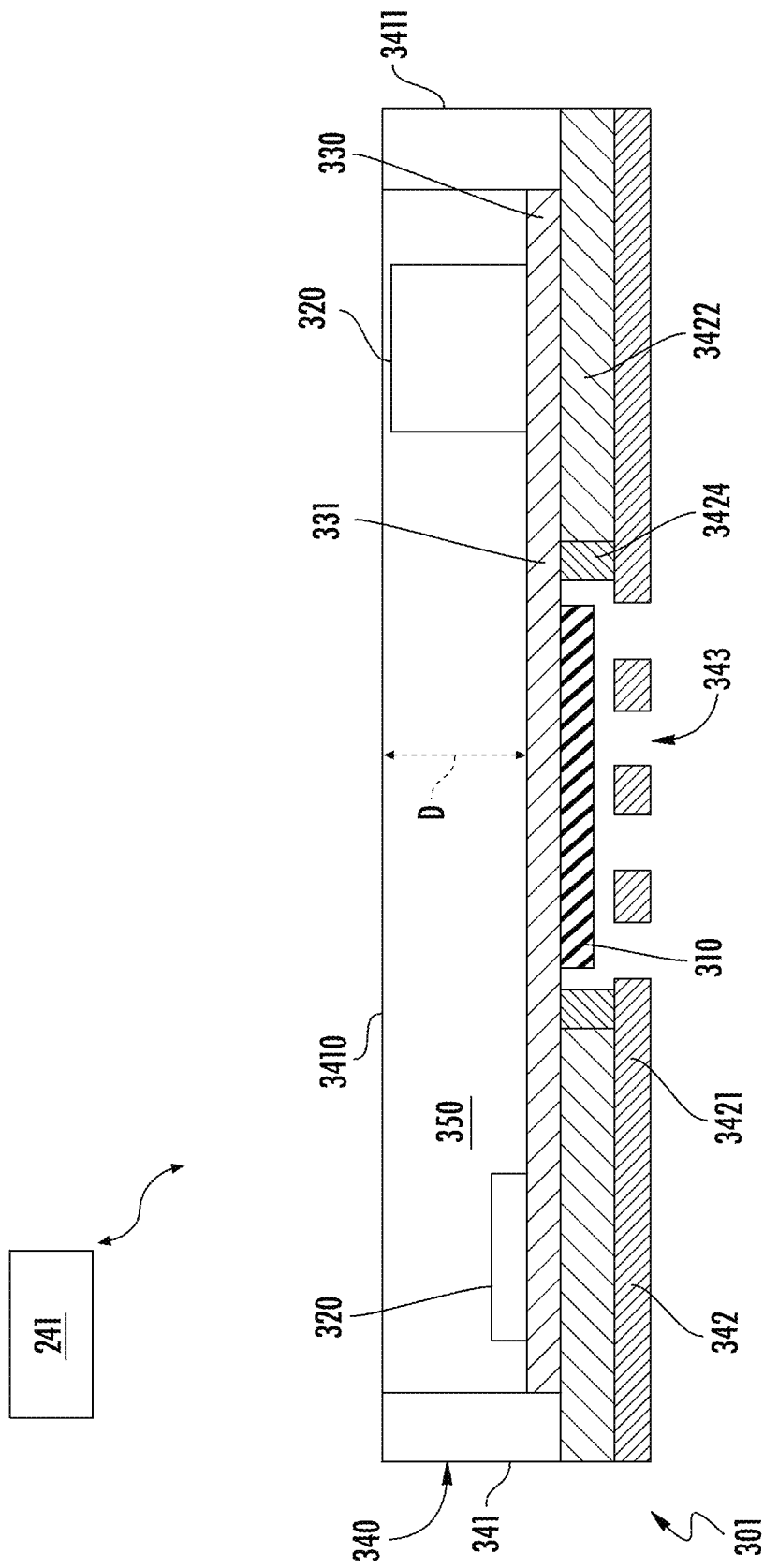
FIG. 3 is a side view of a gas detector which may utilize one or more aspects of the disclosed embodiments.

With reference to FIG. 3, a gas detector (detector) 301 can be provided as the leak sensor 242 of FIG. 2. The detector 301 includes a gas sensing element 310, gas detector electronics 320 that are configured to control operations of the gas detector element 310 and to communicate with the controller 241, a printed circuit board (PCB) 330 on which the gas detector element 310 and the gas detector electronics 320 are disposable and an enclosure 340. The enclosure 340 is configured to expose the gas sensing element 310 to an exterior (i.e., to the refrigerated interior volume 115, any gases or fluids therein and, in particular, to any leaked refrigerant therein). The enclosure 340 is further configured to cooperate with the PCB 330 to form an electronics housing which functions as a gas detection chamber 350. The gas detector electronics 320 are disposable in the gas detection chamber 350 whereby the gas detector electronics 320 are isolated from the exterior.

As shown in FIG. 3, the PCB 330 may include a solid, unitary body 331, which is configured to impede fluid flow from the exterior, through the enclosure 340 and into the gas detection chamber 350. The enclosure 340 may include a body 341 and a cover 342. The PCB 330 may be affixable to the body 341 and the cover 342 is affixable to the body 341 over the PCB 330. From this configuration the PCB 330 is substantially surrounded by the body 341 and the cover 342. One side of the PCB 330 facing the cover 342 and another second side of the PCB 330 facing the body 341. The cover 342 may be formed to define an aperture 343 through which the gas detector element 310 is exposed to the exterior and which may or may not have ribs extending across open space. The body 341 may be formed to define, in cooperation with the PCB 330, the gas detection chamber 350 in which the gas detector electronics 320 are disposable.

The body 341 may include a back-plane 3410 that faces the PCB 330 and sidewalls 3411 that are connected to the PCB 330 and positions the back-plane 3410 at a distance D from the PCB 330. The gas detection chamber 350 may be thus delimited by the back-plane 3410, the sidewalls 3411 and the PCB 330. The distance D may be sufficient to at least tightly accommodate the gas detector electronics 320. The cover 342 may include a cover portion 3421 and a spacer portion 3422, which may be separate components or integrally provided together in a single component, and which is interposed between the PCB 330 and the cover portion 3421. The spacer portion 3422 may include a seal 3424.

The detector 301 may be an infrared (IR) detector in that it may detect gas by monitoring for infrared wavelength absorption or attenuation used in IR sensors embodied in the sensing element 301. The ability of the sensing element 301 to operate may be effected by the level of humidity in the air, and may change the values sensed by the sensing element 301 if temperatures around or inside the sensing element 301 are different than the air entering the sensing element 301. This may create false readings due to calibration errors, causing false triggers of a gas detection or allowing moisture to condense or even freeze in cold environments within the gas detection chamber 350. This may damage the gas detector electronics 320.

Figure 4:
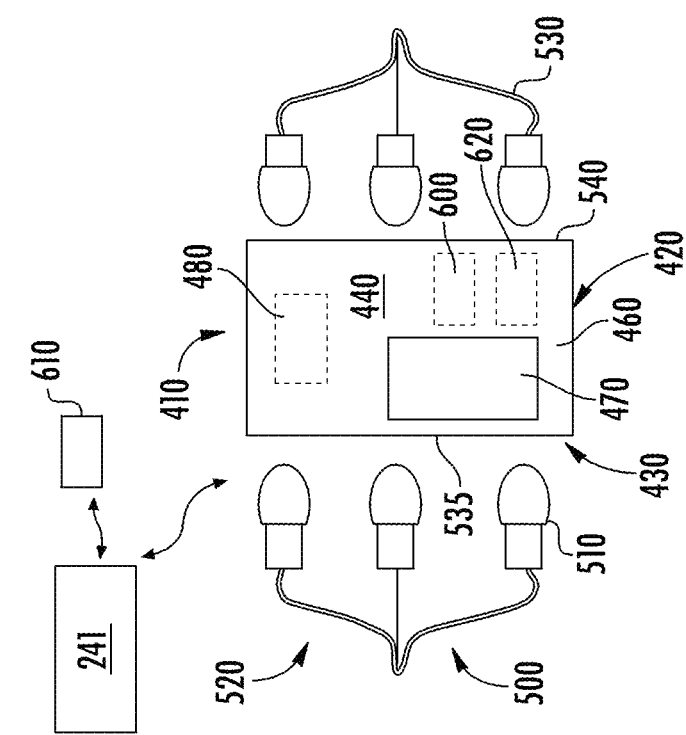
FIG. 4 is gas detector system according to one disclosed embodiment.
Figure 5:
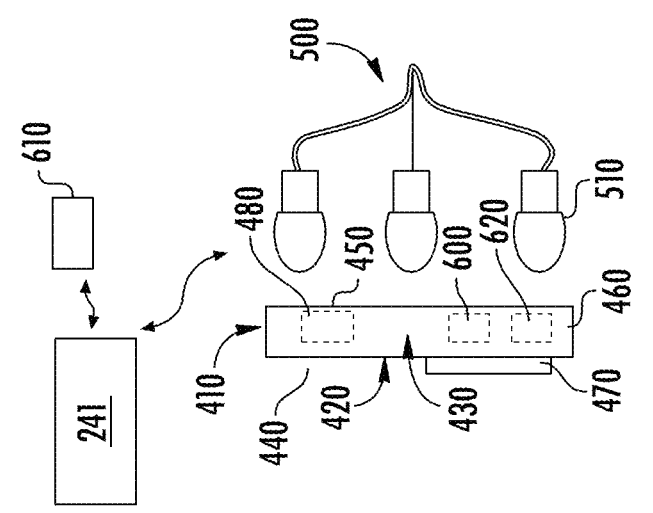
FIG. 5 is gas detector system according to another disclosed embodiment.
Figure 6:
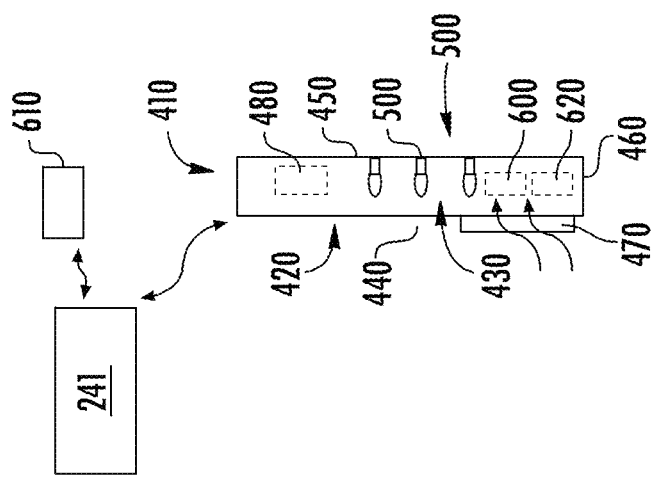
FIG. 6 is heated gas detector system according to a further disclosed embodiment.

In view of the above identified concerns, a sensor system (system) 400 is disclosed in FIGS. 4-6. The system 400 includes a gas detector (detector) 410 which may be the same as the detector 301. For example, the detector 410 includes an enclosure 420 with a plurality of sidewalls 430, a cover 440 and a back-plane 450. The enclosure 420 defines a gas detection chamber (chamber) 460, and the cover includes a chamber opening 470. Gas detector electronics which may comprise an IR sensor 480 are within the chamber 460. The detector 410 may be configured as a non-dispersive infrared (NDIR) detector. The detector 410 may operationally communicate with the controller 241.

According to the disclosed embodiments the system 400 may include a heater 500 that is operationally connected to the controller 241. The heater 500 may include first set of heating elements 510. In the embodiment illustrated in FIG. 4, the heater 500 includes a plurality of sets of heating elements 520 including the first set of heating elements 510 and a second set of heating elements 530. The plurality of sets of heating elements 520 are exterior to the enclosure 420. The first set of heating elements 510 is adjacent one or more of the plurality of sidewalls 430. More specifically, the first set of heating elements 510 is adjacent a first sidewall 535 of the plurality of sidewalls 430. The second set of heating elements 530 is adjacent a second sidewall 540 of the plurality of sidewalls 430.

In the embodiment illustrated in FIG. 5, the heater 500 includes the first set of heating elements 510. The first set of heating elements 510 is exterior to the enclosure 420. The first set of heating elements 510 is adjacent the back-plane 450. In the embodiment illustrated in FIG. 6, the heater 500 includes the first set of heating elements 510. The first set of heating elements 510 is disposed in the chamber 460. The first set of heating elements 510 is against the back-plane 450. The plurality of sets of heating elements 520 are each illustrated as having a plurality of heating elements and more specifically three heating elements. However the number of heating elements is not intended on being limiting.

Figure 7:
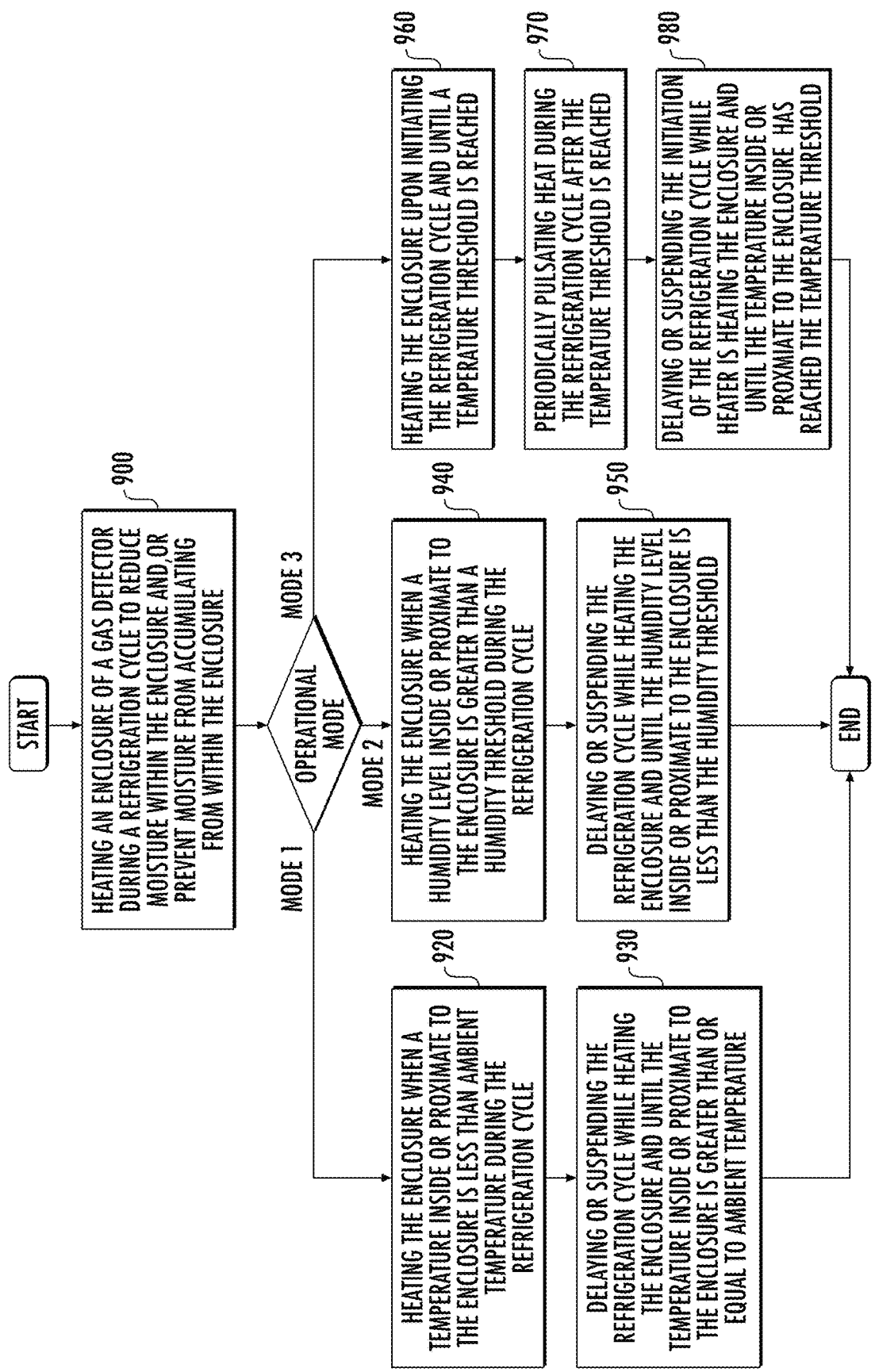
FIG. 7 is a flowchart illustrating operation of a heated gas detector system according to an embodiment.

In each of the embodiments illustrated in FIGS. 4-6, an enclosure temperature sensor 600 may be disposed within or proximate to the enclosure 420. The controller 241 may utilize temperature readings from the enclosure temperature sensor 600 to control the heater 500. The controller 241 may utilize such temperature readings either alone or in comparison with temperature readings from an ambient temperature sensor 610 that reads, for example, an ambient temperature in or around the TRU. A humidity sensor 620 may be disposed within or proximate to the enclosure 420. The controller 241 may utilize humidity level readings from the humidity sensor 620 to control the heater 500. A method of utilizing the temperature readings and/or humidity readings to control the heater 500 are disclosed below and illustrated in FIG. 7.

With reference now to FIG. 4-7 a flowchart (FIG. 7) shows a method of operating the system 400. As illustrated in block 900 the method includes heating an enclosure 420 of the detector 410 during a refrigeration cycle to reduce moisture within the enclosure 420 and/or prevent moisture from accumulating from within the enclosure 420. As indicated the enclosure 420 includes a cover 440, a back-plane 450 and a plurality of sidewalls 430 to define a chamber 460 therein. The cover 440 includes a chamber opening 470. An infrared sensor (IR sensor) 480 is disposed within the chamber 460. A heater 500 for heating the enclosure 420 is adjacent to or within the enclosure 420. The heater 500 is operationally connected to the controller 241 (FIG. 4).

As illustrated in block 910, the system 400 may operate in accordance with one of a plurality of modes, depending on a configuration of the system 400. As illustrated in block 920, in a first operational mode (MODE 1 at block 910) heating the enclosure 420 when a temperature inside or proximate to the enclosure 420 is less than ambient temperature during the refrigeration cycle. To function in this mode of operation an enclosure temperature sensor 600 may be operationally connected to the heater 500. The enclosure temperature sensor 600 is disposed inside or proximate to the enclosure 420. In FIGS. 4-6, the enclosure temperature sensor 600 is schematically illustrated inside the enclosure 420. An ambient temperature sensor 610 may read ambient temperature. The ambient temperature sensor 610 or the TRU may be located outside of a refrigerated interior volume (see FIG. 2). As illustrated in block 930, in this mode of operation the method may include delaying or suspending the refrigeration cycle while heating the enclosure 420 and until the temperature inside or proximate to the enclosure 420 is greater than or equal to ambient temperature.

As illustrated in block 940, in a second operational mode (MODE 2 at block 910), the method includes heating the enclosure 420 when a humidity level inside or proximate to the enclosure 420 is greater than a humidity threshold during the refrigeration cycle. For this mode of operation a humidity sensor 620 is operationally connected to the heater 500. The humidity sensor 620 is disposed inside or proximate to the enclosure 420. In FIGS. 4-6, the humidity sensor 620 is schematically illustrated inside the enclosure 420. In this mode of operation, as shown in block 950, the method includes delaying or suspending the refrigeration cycle while heating the enclosure 420 and until the humidity level inside or proximate to the enclosure 420 is less than the humidity threshold.

As shown in block 960, in a third mode of operation (MODE 3 at block 910) the method includes heating the enclosure 420 upon initiating the refrigeration cycle and until a temperature threshold is reached. For this mode of operation, as with the first mode of operation, the enclosure temperature sensor 600 is operationally connected to the heater 500. The enclosure temperature sensor 600 being disposed inside or proximate to the enclosure. In this mode of operation, as shown in block 970, the method includes periodically pulsating heat during the refrigeration cycle after the temperature threshold is reached. As shown in block 980, the method further includes delaying or suspending the initiation of the refrigeration cycle while heater is heating the enclosure 420 and until the temperature inside or proximate to the enclosure 420 has reached the temperature threshold.

In one embodiment a combination of the above identified modes is utilized to reduce moisture within the enclosure and/or prevent moisture from accumulating from within the enclosure. Additionally, thresholds identified herein may vary according to a psychrometric understanding, thereby ensuring that the sensor operates at temperature and humidity levels where calibration is capable of being executed and the reading are more accurate.

According to the above disclosed embodiments, a heating system (system) 400 is provided to melt and vaporize frozen moisture inside the gas detection chamber 350, and to increase temperatures within the gas detection chamber 350 to promote elimination of moisture inside the gas detection chamber 350. It will also actively prevent moisture from re-entering the gas detection chamber 350. The system 400 may utilize enclosure temperature sensor 600, the ambient temperature sensor 610 and/or the humidity sensor 620 disposed around the gas detector electronics 320 to determine when the detector 301 may correctly identify if detectable gas is present in the atmosphere. The disclosed embodiments may enhance the utilization of a gas detector using IR technology for accuracy and robustness. The disclosed embodiments also provide a control logic that may enable saving power consumption if limited power source is applied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A gas detector system for a refrigerated interior volume of a transportation refrigeration unit (TRU), the system comprising: a gas detector that defines an enclosure, the enclosure defines a chamber therein, the enclosure includes a cover including a chamber opening, and an infrared (IR) sensing element within the chamber; and a heater adjacent to or within the enclosure, the heater configured to reduce moisture within the chamber and/or prevent moisture from accumulating from within the chamber during a refrigeration cycle, wherein the system comprises
    an enclosure temperature sensor disposed inside or proximate to the enclosure, wherein during the refrigeration cycle: when a temperature inside or proximate to the enclosure is less than ambient temperature, the heater is activated; and when the temperature inside or proximate to the enclosure is greater than ambient temperature, the heater is deactivated.

2. The transport refrigeration unit (TRU) comprising a compressor, a condenser, an evaporator, a controller operationally connected to the compressor, the condenser and the evaporator, and the refrigerated interior volume, the refrigerated interior volume including the system of claim 1, wherein the heater is operationally connected to the controller.

3. The transport refrigeration unit (TRU) of claim 2, wherein the controller is configured to delay or suspend the refrigeration cycle while the heater is heating the enclosure and until the temperature inside or proximate to the enclosure is greater than or equal to ambient temperature.

4. A gas detector system for a refrigerated interior volume of a transportation refrigeration unit (TRU), the system comprising: a gas detector that defines an enclosure, the enclosure defines a chamber therein, the enclosure includes a cover including a chamber opening, and an infrared (IR) sensing element within the chamber; and a heater adjacent to or within the enclosure, the heater configured to reduce moisture within the chamber and/or prevent moisture from accumulating from within the chamber during a refrigeration cycle, wherein the system comprises a humidity sensor operationally connected to the heater, disposed inside or proximate to the enclosure, wherein during the refrigeration cycle: when a relative humidity level inside or proximate to the enclosure is greater than a humidity threshold, the heater is activated; and when the relative humidity level inside or proximate to the enclosure is less than the humidity threshold, the heater is deactivated.

5. The system of claim 4, wherein the temperature threshold and humidity threshold vary and correlate with one another.

6. The transport refrigeration unit (TRU) comprising a compressor, a condenser, an evaporator, a controller operationally connected to the compressor, the condenser and the evaporator, and the refrigerated interior volume, the refrigerated interior volume including the system of claim 4, wherein the heater is operationally connected to the controller.

7. The transport refrigeration unit (TRU) of claim 6, wherein the controller is configured to delay or suspend the refrigeration cycle while the heater is heating the enclosure and until the humidity level inside or proximate to the enclosure is less than the humidity threshold.

8. A gas detector system for a refrigerated interior volume of a transportation refrigeration unit (TRU), the system comprising: a gas detector that defines an enclosure, the enclosure defines a chamber therein, the enclosure includes a cover including a chamber opening, and an infrared (IR) sensing element within the chamber; and a heater adjacent to or within the enclosure, the heater configured to reduce moisture within the chamber and/or prevent moisture from accumulating from within the chamber during a refrigeration cycle, wherein the heater comprises a plurality of heating elements mutually spaced alongside one or more of the plurality of sidewalls of the enclosure or within the chamber, wherein the system comprises, comprising an enclosure temperature sensor operationally connected to the heater, the enclosure temperature sensor disposed inside or proximate to the enclosure, wherein: the heater is activated upon initiating the refrigeration cycle, and when a temperature threshold is reached at the enclosure, the heater is deactivated.

9. The transport refrigeration unit (TRU) comprising a compressor, a condenser, an evaporator, a controller operationally connected to the compressor, the condenser and the evaporator, and the refrigerated interior volume, the refrigerated interior volume including the system of claim 8, wherein the heater is operationally connected to the controller.

10. The transport refrigeration unit (TRU) of claim 9, wherein when initiating the refrigeration cycle the controller is configured to delay or suspend the refrigeration cycle while the heater is heating the enclosure and until the temperature inside or proximate to the enclosure has reached the temperature threshold.

11. A method of operating a gas detector system for a refrigerated interior volume of a transportation refrigeration unit (TRU), the method comprising: heating an enclosure of a gas detector during a refrigeration cycle to reduce moisture within the enclosure and/or prevent moisture from accumulating from within the enclosure, wherein the enclosure defines a chamber therein, the enclosure includes a cover including a chamber opening, and an infrared (IR) sensor is disposed within the chamber, and wherein a heater configured for heating the enclosure is adjacent to or within the enclosure, wherein the method further comprises one of:

heating the enclosure when a temperature inside or proximate to the enclosure is less than ambient temperature during the refrigeration cycle, wherein an enclosure temperature sensor is operationally connected to the heater and the enclosure temperature sensor is disposed inside or proximate to the enclosure;

heating the enclosure when a humidity level inside or proximate to the enclosure is greater a humidity threshold during the refrigeration cycle, wherein a humidity sensor is operationally connected to the heater, and the humidity sensor is disposed inside or proximate to the enclosure; or heating the enclosure upon initiating the refrigeration cycle and until a temperature threshold is reached, wherein an enclosure temperature sensor is operationally connected to the heater, the enclosure temperature sensor being disposed inside or proximate to the enclosure.

12. The method of claim 11, comprising:

heating the enclosure when the temperature inside or proximate to the enclosure is less than ambient temperature during the refrigeration cycle, wherein the enclosure temperature sensor is operationally connected to the heater and the enclosure temperature sensor is disposed inside or proximate to the enclosure; and delaying or suspending the refrigeration cycle while heating the enclosure and until the temperature inside or proximate to the enclosure is greater than or equal to ambient temperature.

13. The method of claim 11, comprising:

heating the enclosure when the humidity level inside or proximate to the enclosure is greater the humidity threshold during the refrigeration cycle, wherein the humidity sensor is operationally connected to the heater, and the humidity sensor is disposed inside or proximate to the enclosure; and delaying or suspending the refrigeration cycle while heating the enclosure and until the relative humidity level inside or proximate to the enclosure is less than the relative humidity threshold.

14. The method of claim 11, comprising:

heating the enclosure upon initiating the refrigeration cycle and until the temperature threshold is reached, wherein the enclosure temperature sensor is operationally connected to the heater, the enclosure temperature sensor being disposed inside or proximate to the enclosure; and periodically pulsating heat during the refrigeration cycle after the temperature threshold is reached.

15. The method of claim 14, comprising delaying or suspending the initiating of the refrigeration cycle while heating the enclosure and until the temperature inside or proximate to the enclosure has reached the temperature threshold.

* * * * *